United States Patent
Borst

(10) Patent No.: US 8,401,824 B2
(45) Date of Patent: Mar. 19, 2013

(54) METHOD FOR DETERMINING AN OUTPUT VALUE OF A SENSOR OF AUTOMATION TECHNOLOGY

(75) Inventor: Walter Borst, Fachingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 628 days.

(21) Appl. No.: 12/087,006

(22) PCT Filed: Dec. 6, 2006

(86) PCT No.: PCT/EP2006/069370
§ 371 (c)(1),
(2), (4) Date: Jul. 26, 2010

(87) PCT Pub. No.: WO2007/077087
PCT Pub. Date: Jul. 12, 2007

(65) Prior Publication Data
US 2010/0292939 A1    Nov. 18, 2010

(30) Foreign Application Priority Data
Dec. 28, 2005  (DE) .......................... 10 2005 062 981

(51) Int. Cl.
*G06F 19/00*   (2011.01)
(52) U.S. Cl. .......... 702/189; 702/85; 702/104; 702/108; 702/116

(58) Field of Classification Search .................... 702/45, 702/50, 130, 104, 86, 189, 108, 116, 85
See application file for complete search history.

(56) References Cited

U.S. PATENT DOCUMENTS

| | | | |
|---|---|---|---|
| 5,325,314 A | 6/1994 | Lippmann |
| 5,369,603 A | 11/1994 | Myers |
| 2005/0039547 A1 | 2/2005 | Bitto |

FOREIGN PATENT DOCUMENTS

| | | |
|---|---|---|
| DE | 197 49 056 A1 | 5/1999 |
| DE | 102 04 442 A1 | 8/2003 |
| DE | 103 36 046 A1 | 3/2004 |
| DE | 103 39 405 B3 | 3/2005 |

OTHER PUBLICATIONS

P. Hille et al.: A Linerisation and Compensation Method for Integrated Sensors, Lausanne, Switzerland vol. A44, No. 2, Aug. 1994. pp. 95-102.

*Primary Examiner* — Jonathan C Teixeira Moffat
*Assistant Examiner* — Hien Vo
(74) *Attorney, Agent, or Firm* — Bacon & Thomas, PLLC

(57) ABSTRACT

In a method for determining an output value of a sensor of automation technology, in a case in which the sensor has a non-linear characteristic curve K, which is pointwise specified, help points $H_j$ are additionally produced according to a simple calculational specification. The output value is obtained from the input value via an interpolation of at least two points of the characteristic curve.

6 Claims, 2 Drawing Sheets

METHOD FOR DETERMINING AN OUTPUT VALUE OF A SENSOR OF AUTOMATION TECHNOLOGY

TECHNICAL FIELD

The invention relates to a method for determining an output valve of a sensor used in automation technology having a non-linear characteristic curve describing a functional relationship between an input varible and an output variable of the sensor.

BACKGROUND DISCUSSION

In automation technology, sensors are often used, which have a non-linear, measuring-transducer characteristic curve. In such case, the measurement signal of the measuring transducer depends non-linearly on the process variable to be measured, e.g. pressure or temperature, etc. In order to obtain a linear output signal of the sensor, e.g. for a 4-20 mA current loop, a processing of the measurement signal is necessary. This processing is done with the help of a linearizing curve, which normally is specified via a plurality of support points. Since, in practice, other points of the linearizing curve are needed, corresponding approximations are needed.

A very simple approximation method is linear interpolation. In such case, the support points are connected together via straight-line segments. This type of interpolation is, however, not sufficient for the accuracy requirements of modern sensors, above all, when the support points lie relatively far from one another. Better methods for obtaining the linearizing curve are polynomial approximation or spline approximation.

These approximation methods require, however, a very high calculational effort. Calculational capacities in the case of sensors of automation technology are, however, partially very limited, especially in the case of sensors which are supplied with energy via the communication connection, i.e. so-called 2-conductor devices. The firm Endress+Hauser produces and distributes a large number of such sensors.

A further disadvantage of these approximation methods is that the ascertained curve does not pass exactly through the predetermined support points. Thus, an assumption is that the linearizing curve is exact at the support points. Additionally, in the case of a polynomial approximation, so-called "over-oscillators" can arise, which lead to inaccuracies.

SUMMARY OF THE INVENTION

An object of the invention is to provide a method for determining an output value of a sensor of automation technology without the above-described disadvantages, especially a method requiring no great calculational effort, which is accurate at the support points and, overall, as accurate as possible.

This object is achieved by comprising the step of:
producing a characteristic curve K pointwise via a point set SP of points P1-Pn (calibration points) and an expanded point set SP' with additional help points $H_j$; said help points $H_j$ are obtained via, in each case, neighboring points of the point set SP $P_{i+1}$, $P_{i+2}$, $P_{i+3}$, $P_{i+4}$, these being obtained according to the following calculational specification:
A. Determining slopes m1, m2, m3 of three line segments g1=$P_{i+1}$ $P_{i+2}$, q2=$P_{i+2}$ $P_{i+3}$ and g3=$P_{i+3}$ $P_{i+4}$;
B. calculating slope $mP_{i+2}$=(m1+m2)/2 of a first help line h1;
C. calculating slope $mP_{i+3}$=(m2+m3)/2 of a second help line h2;
D. determining intersection S of the two help lines h1 and h2, wherein the two help lines h1, h2 pass through the points $P_{i+2}$, $P_{i+3}$, respectively;
E. taking the intersection S as help point $H_j$ in an expanded point set SP'; and
ascertaining the value of the output variable from the value of the input variable via an interpolation of at least two points of the expanded point set SP' of the characteristic curve K.

Method for determining an output value of a sensor of automation technology having a non-linear characteristic curve describing a functional relationship between an input variable and an output variable of the sensor, wherein the characteristic curve is predetermined pointwise over a point set SP of points P1-Pn, and an expanded point set SP' of the characteristic curve K with additional help points $H_j$ is produced,
wherein the help points $H_j$ are obtained via, in each case, 4 neighboring points of the point set SP $P_{i+1}$, $P_{i+2}$, $P_{i+3}$, $P_{i+4}$ according to the following calculational specification:
A. determining the slopes m1, m2, m3 of the three line segments g1+$P_{i+1}$ $P_{i+2}$, g2=$P_{i+2}$ $P_{i+3}$ and g3=$P_{i+3}$ $P_{i+4}$;
B. calculating the slope $m_{Pi+2}$=(m1+m2)/2 of a first help line h1;
C. calculating the slope $M_{Pi+3}$=(m2+m3)/2 of a second help line h2;
D. determining the intersection S of the two help lines h1 and h2, wherein the two help lines h1, h2 go through the points $P_{i+2}$, $P_{i+3}$, respectively;
E. taking the intersection S as help point $H_j$ in the expanded point set SP'.

In order to ascertain the value of the output variable from the value of the input variable, an interpolation is performed with at least two points of the expanded point set SP' of the characteristic curve K.

Advantageous further developments of the invention are given in the dependent claims.

An essential idea of the invention is that help points are so constructed that the slope change $\Delta m_j$ at the help point $H_j$ is, in each case, a fourth of the sum of the slope changes of the line segments in the two neighboring points $P_{i+2}$, $P_{i+3}$, i.e.

$$\Delta m_j = \frac{\frac{m2-m1}{2} + \frac{m3-m2}{2}}{2}$$

BRIEF DESCRIPTION OF THE DRAWINGS

The invention will now be explained in greater detail on the basis of an example of an embodiment presented in the drawing, the figures of which show as follows.

DETAILED DISCUSSION

Figure 1:
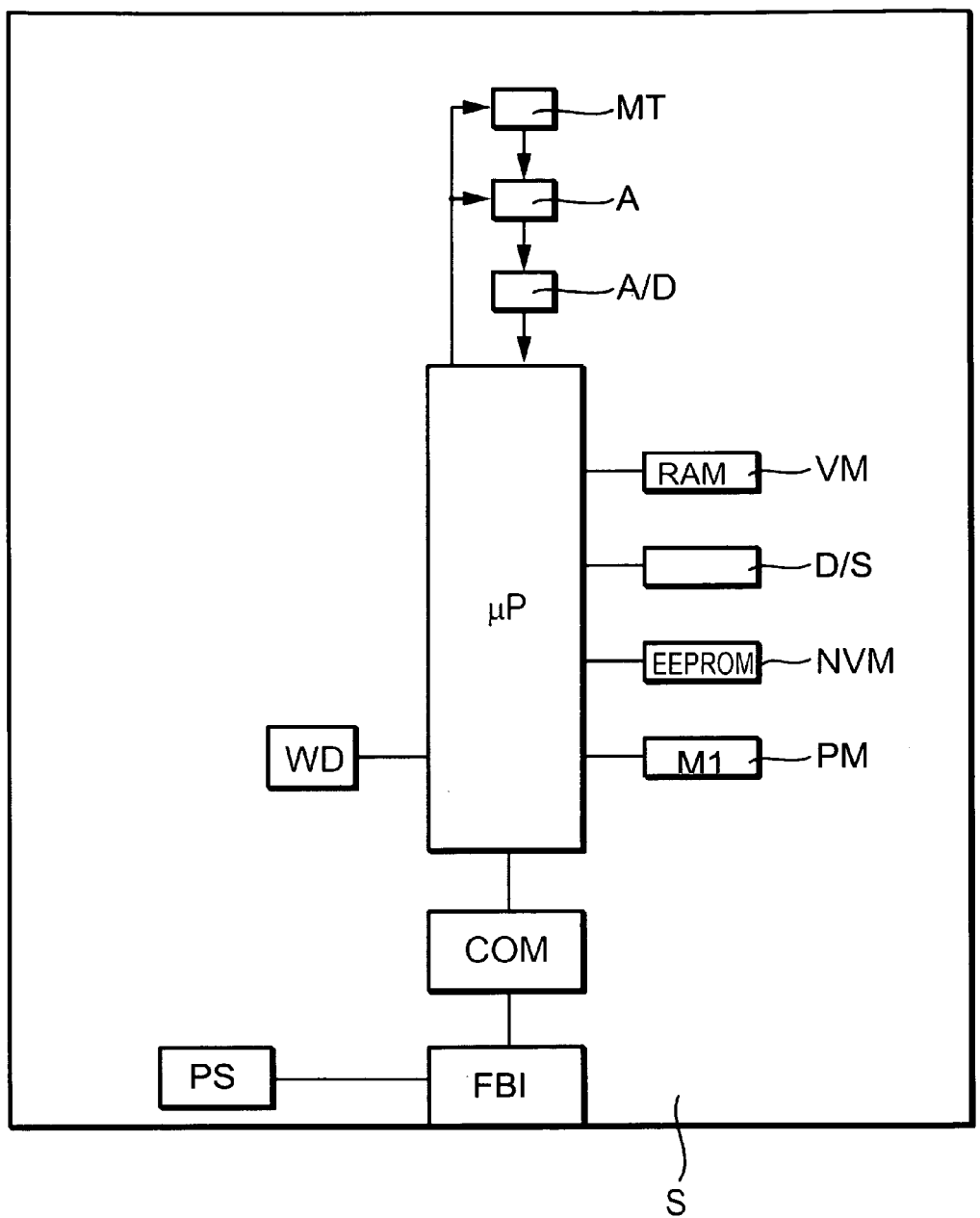
FIG. 1 is a sensor of automation technology in schematic representation.

FIG. 1 shows a block diagram of a sensor S of automation technology in greater detail. A microprocessor μP is connected via an analog-digital converter A/D and an amplifier A with a measuring transducer MT, which registers a process variable (e.g. pressure, flow or fill level). The microprocessor µP is connected with a number of memories. The memory VM serves as temporary (volatile), working memory RAM. In memory PM, a program memory, software or software components is/are stored, to be executed in the microprocessor µP.

In a non-volatile, writable, data memory NVM, e.g. EEPROM-memory, parameter values (e.g. calibration data, etc.) are stored.

The program (firmware) running in the microprocessor defines, among other things, the application-related functionalities of the field device (measured value calculation, envelope-curve evaluation, linearizing of measured values, diagnostic tasks).

Additionally, the microprocessor µP is connected with a display/service unit D/S (e.g. LCD-display with a number of push-buttons), via which a user can manually interact with the field device and obtain display of measured values, envelope curves or parameter values.

A monitoring unit WD (watch-dog), which is likewise connected with the microprocessor µP, monitors the functioning of the microprocessor µP. If a program interruption happens due to a system error, the monitoring unit WD triggers a program re-start.

Via a communication interface COM, the microprocessor µP is connected with an external interface FBI. This serves for connecting the sensor S to a communication connection (e.g. 4-20 mA current loop). Alternatively, the communication connection can also be a fieldbus system, e.g. Profibus or Foundation Fieldbus or a HART-connection.

The sensor is provided with energy via a power supply fed via the communication connection (2-wire device). Alternatively, also a separated supply is provided (4-wire device).

Figure 2:
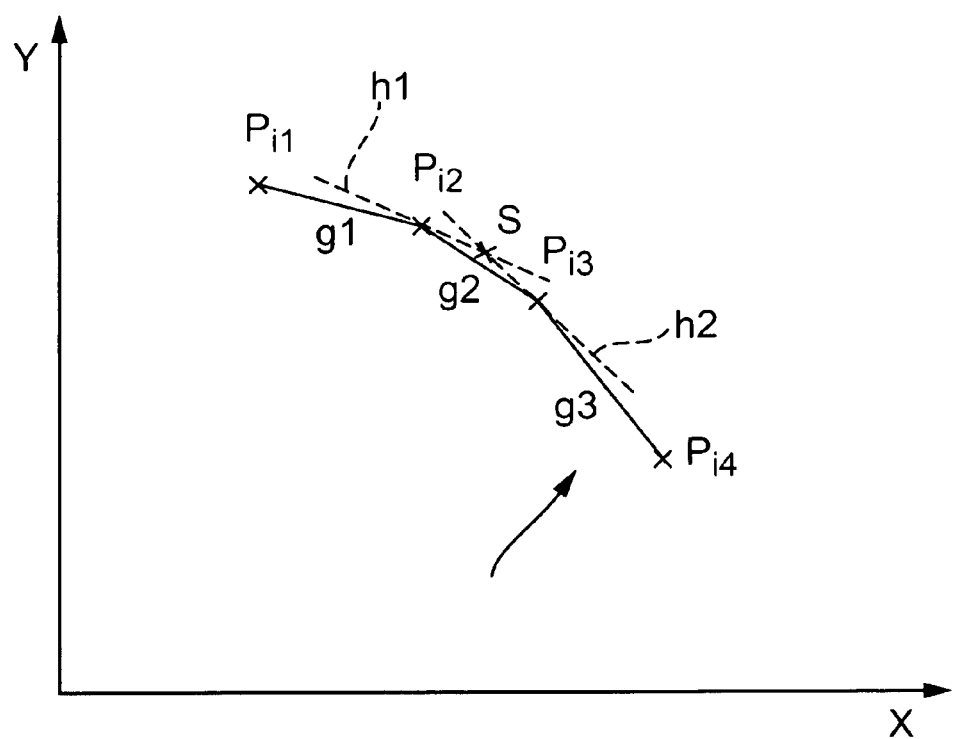
FIG. 2 is a construction of a help point according to the method of the invention.

Plotted in FIG. 2 on an xy-coordinate graph are several points $P_{i1}$, $P_{i2}$, $P_{i3}$ and $P_{i4}$ of a non-linear characteristic curve K. The corresponding straight-line segments between these points are labeled g1, g2 and g3. In a first method step A, the slopes m1, m2, m3 of the lines g1, g2, g3 are determined. Then, in method steps B and C, the slopes $m_{Pi+2}=(m1+m2)/2$ and $m_{Pi+3}=(m2+m3)/2$ of two help lines h1 and h2 are calculated.

In method step D, the point of intersection S of the two help lines h1 and h2 is determined. The help lines h1 and h2 pass through the points $P_{i+2}$, $P_{i+3}$, respectively.

In method step E, the point of intersection S is taken into the expanded point set SP' as new help point $H_j$.

The slope change $\Delta m_j$ of the two help lines h1 and h2 at point $H_j$ is $$\Delta m_j = \frac{\frac{m2-m1}{2}+\frac{m3-m2}{2}}{2},$$

thus a fourth of the slope changes of the straight line segments in the points $P_{i+2}$, $P_{i+3}$.

This method can be carried out very rapidly and easily by a corresponding computer program. Only linear equations are used, so that the computer program requires only little resources of the microprocessor µP.

The non-linear characteristic curve can be approximated to any desired degree of accuracy by repeated execution of the method. In such case, the point set SP is then expanded every time by the newly obtained help points $H_j$.

Figure 3:
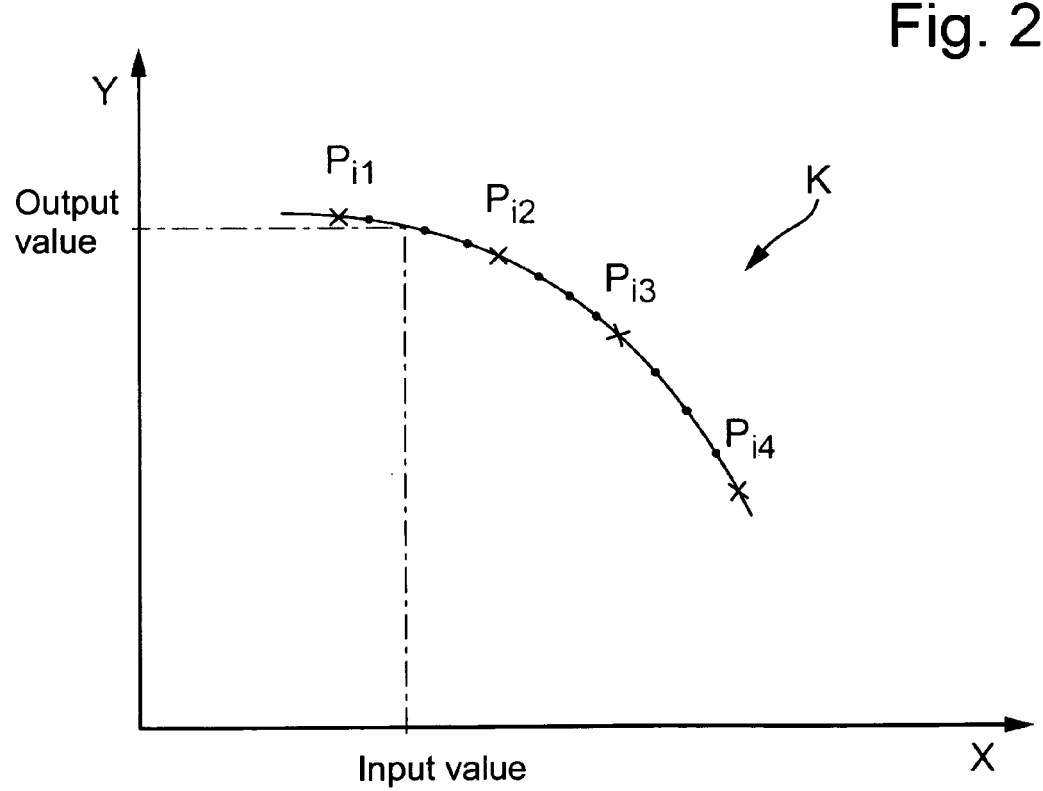
FIG. 3 is a non-linear characteristic curve of a sensor.

FIG. 3 shows a non-linear characteristic curve K obtained with the method of the invention. The additionally obtained points are shown as small circles.

If the points of the non-linear characteristic curve K are determined sufficiently densely, then a linear interpolation between two points of the characteristic curve is sufficient for determining the output value associated with an input value with sufficient accuracy.

The method of the invention is suited especially for sensors having a 4-20 mA measured value output. The invention is, naturally, not limited to analog sensors, but is, instead, suited just as well for sensors having a digital output, or sensors transmitting measured values via a fieldbus system.

The method is especially suited for temperature sensors, pressure sensors or mass-flow meters.

The characteristic curve K can be a linearizing curve. The method is also suited for approximation of calibration curves, which are likewise specified pointwise.

Translation of German symbols and words in the drawing
FIG. 1:
Change "MA" to -MT-;
change "V" to -A-;
change "A/B" to -D/S-;
change "PS" to -PM-;
change "S1" to -M1-;
change "FBS" to -FBI-; and
change "NT" to -PS-.
FIG. 3:
Change "Ausgangswert" to -Output value-; and
change "Eingangswert" to -Input value-.

The invention claimed is:

1. A method for determining an output value of a sensor of automation technology having a non-linear characteristic curve describing a functional relationship between an input variable and an output variable of the sensor, the sensor having a microprocessor for conducting calculations, the method comprising the step of:

producing a characteristic curve K pointwise via a point set SP of calibration points P1-Pn and an expanded point set SP' with additional help points $H_j$; said help points $H_j$ are obtained via, in each case, neighboring points of the point set SP $P_{i+1}$, $P_{i+2}$, $P_{i+3}$, $P_{i+4}$, these being obtained according to the following calculational specification carried out by the microprocessor:

A. determining slopes m1, m2, m3 of three line segments g1=$P_{i+1}$, $P_{i+2}$, g2=$P_{i+2}$ $P_{i+3}$ and g3=$P_{i+3}$ $P_{i+4}$;

B. calculating slope $mP_{i+2}=(m1+m2)/2$ of a first help line h1;

C. calculating slope $mP_{i+3}=(m2+m3)/2$ of a second help line h2;

D. determining intersection S of the two help lines h1 and h2, wherein the two help lines h1, h2 pass through the points $P_{i+2}$, $P_{i+3}$, respectively;

E. taking the intersection S as help point $H_j$ in an expanded point set SP'; and ascertaining the value of the output variable from the value of the input variable via an interpolation of at least two points of the expanded point set SP' of the characteristic curve K.

2. The method as claimed in claim 1, wherein:
the expanded point set SP' serves as point set SP with points P1-Pn' and the calculational specification is repeatedly applied.

3. The method as claimed in claim 1, wherein:
the value of the output variable is obtained via a linear interpolation between points of the characteristic curve neighboring the value of the input variable.

4. The method as claimed in claim 1, wherein:
the output variable is transmitted as a 4-20 mA signal or digitally.

5. The method as claimed in claim 1, wherein:
the sensor is a temperature sensor, pressure sensor or a mass-flow meter.

6. The method as claimed in claim 1, wherein:
the characteristic curve is a linearizing curve or a calibration curve.

\* \* \* \* \*